United States Patent [19]
Kogure et al.

[11] Patent Number: 5,432,387
[45] Date of Patent: Jul. 11, 1995

[54] POWER SOURCE VOLTAGE SUPPLY CONTROLLING APPARATUS

[75] Inventors: Kazuya Kogure, Kiryu; Kazuya Akiyama; Yoshitaka Ikeda, both of Ora; Masakazu Kuribara, Ota, all of Japan

[73] Assignee: Sanyo Electric Co., Ltd., Osaka, Japan

[21] Appl. No.: 19,742

[22] Filed: Feb. 19, 1993

[30] Foreign Application Priority Data

Feb. 21, 1992 [JP] Japan ................................. 4-035273
Feb. 21, 1992 [JP] Japan ................................. 4-035274

[51] Int. Cl.⁶ ............................................. G06F 1/26
[52] U.S. Cl. .................................. 307/328; 307/141; 307/142
[58] Field of Search ............... 307/112, 113, 125, 139, 307/141, 141.4, 141.8, 328, 142

[56] References Cited

U.S. PATENT DOCUMENTS

| | | | |
|---|---|---|---|
| 4,312,035 | 1/1982 | Greene | 364/200 |
| 4,669,059 | 5/1987 | Little et al. | 364/900 |
| 4,718,007 | 1/1988 | Yukino | 364/200 |
| 4,890,006 | 12/1989 | Huang | 307/112 |
| 5,196,731 | 3/1993 | Abe et al. | 307/142 |
| 5,283,475 | 2/1994 | Berger | 307/141.4 |

FOREIGN PATENT DOCUMENTS

| | | |
|---|---|---|
| 0303020 | 2/1989 | European Pat. Off. . |
| 0444757 | 9/1991 | European Pat. Off. . |
| 2627907 | 9/1989 | France . |
| 58-72225 | 4/1983 | Japan . |
| 60-89225 | 5/1985 | Japan . |
| 1128111 | 5/1989 | Japan . |

OTHER PUBLICATIONS

European Search Report, dated Dec. 29, 1994, App. No. 93102665.2.
"Control Panel for Models of AS/400" IBM Technical Disclosure Bulletin, vol. 32, No. 9B, Feb. 1990, pp. 125–129.
R. Bealkowski, et al., "Personal Computer Security Lock", IBM Technical Disclosure Bulletin, vol. 27, No. 5, Oct. 1984, pp. 2897–2899.

*Primary Examiner*—A. D. Pellinen
*Assistant Examiner*—Jonathan Kaplan
*Attorney, Agent, or Firm*—Spensley Horn Jubas & Lubitz

[57] ABSTRACT

A switching means is provided in a power source line for supplying the A.C. power source of a main power source circuit. A lock switch is separately provided. In the normal state, the lock switch is in a locked off state, thereby controlling the on-off operation of the switching means by the automatic on-off function based on a power source operating switch and timer etc. By turning the lock switch off, the switching means is locked, thereby overriding the automatic on-off function and the power source operating switch.

12 Claims, 6 Drawing Sheets

POWER SOURCE VOLTAGE SUPPLY CONTROLLING APPARATUS

BACKGROUND OF THE INVENTION

1. Field of the Invention

The present invention relates to a power source voltage control apparatus, in a data processing apparatus such as a personal computer, for controlling the supply and stop of power source voltage in accordance with a switching operation or automatically at a predetermined time.

2. Description of the Related Art

Providing a plurality of manual operating switches for power source control has conventionally been used as disclosed in Japanese Patent Laid-Open NO. Hei 1-128111. In such an apparatus, it is usual to insert a manually operable main switch into a power source supply line, in addition to a manual power source switch normally operated by a user.

Further, in general, the normally used power source switch is mounted so as to be exposed at the surface of the device body while the main switch is mounted at the reverse surface of the device because it is not being so frequently used.

In such a conventional structure, if the main switch is kept turned off, the supply of the power source is stopped so the power source is not started even when the power source switch is turned on. Therefore, if the main switch is turned off, it is possible to prevent any unauthorised person from starting the power source. However, even if the main switch is turned off in a state where the power source is already supplied, the result is only to stop the power source, it does not prevent an unauthorised third person from stopping the power source when the power source is in the supplying state.

Further, if the third person is aware of the location of the main switch at the reverse side of the device, such a structure is totally meaningless from a security point of view.

A possible remedy for such a problem would be to lock the power source itself, but this method will in turn complicate the normal power source operation.

Further, as disclosed in Japanese Patent Laid-Open No. Sho 60-89225, it has been conventional practice to previously set a time for turning on or off the power source so as to automatically turn on or off the power source when the current time coincides with the set time.

In a conventional device having an automatic on-off function, the on-off operation of the power source can be conveniently carried out without manual operation, but once a time is set the automatic on-off function is always activated without allowing to temporarily pause the function. Therefore, in such a case, there has been no other method than to change the setting for executing one by one the schedule program.

SUMMARY OF THE INVENTION

It is therefore an object of this invention to make the function of a power source switch by the simple operation.

It is another object of tills invention to override the function of a power source switch by the use of another lock switch while keeping the operation thereof in usual use unchanged.

It is further another object of this invention to temporarily override an automatic power source on-off function by a simple operation.

According to the present invention, there is provided a power source voltage control apparatus for controlling the supply and stop of the power source voltage to essential parts of the device, comprising: a switching means inserted into a supply line of the power source voltage for controlling the supply and stop of the power source voltage; a power source manual operation switch for manually controlling the on-off effect of the switching means; a manual lock switch capable of being set in either lock-off or lock-on state; and a control means for controlling the on-off effect of the switching means in accordance with the on-off function of the power source operating switch, and when the the lock switch is in a lock-on state it keeps the state of the switching means as it is irrespective of the on-off state of the power source operating switch.

Thus, in the present invention, if the lock state is set to the lock-on state while in a power source voltage supply state, the power source cannot be stopped even if the power source switch is operated. Further, if the lock switch is set to the lock-on state with the power source stopped, the power source cannot be started even if the power source operating switch is turned on. Thus, by setting the lock switch to the lock-on state, the supply-stopping function of the power source voltage of the power source operating switch can overridden, thereby preventing undesirable turning on or off of the power source by an unauthorized third person with a secure administration of the apparatus. By setting the lock switch to a lock-off state, the normal power source on-off control can be carried out by the operation of the power source operating switch. In this manner, since the normal operation is kept unchanged as is conventional, the power source controlling mechanism does not become obvious to the third person so it is to effectively protected from being tampered with by the third person.

Further, said controlling means includes a D-type flip-flop having an output terminal coupled to the D input terminal for receiving a signal sent from the power source operating switch at its CK terminal to control the tranmission of the signal generated by the on-off operation of the power source operating switch to the CK terminal.

In this manner, the state can be securely maintained in the lock-on state.

Further, the apparatus includes a sub-power source circuit for receiving a power source supply from a power source voltage supply at the upstream side of the switching means, the sub-power source circuit applying a voltage to the power source operating switch, lock switch and controlling means.

According to such a composition, it is possible to control supply of a power source voltage without providing any particular power source such as a battery.

Further, a lid for covering the lock switch may be provided so as to render the lock switch unviewable externally by closing the lid.

Furthermore, a key for locking the lid may be provided to effectively restrict use by the third person.

Further, according to such a composition, it is possible to prevent the power source controlling mechanism from becoming easily known to the third person.

The present invention is directed to a power source voltage supply controlling apparatus for controlling a supply and shutting down of a power source voltage for the essential parts of the apparatus, comprising a switching means for controlling a supply and stop of a power source voltage by being inserted into a supply line of the power source voltage; a time counting means for detecting the current time; a memory means for storing a set time; a comparing means for comparing a set time stored in memory means to a current time; a manual lock switch capable of being set to a lock-off state and a lock-on state; and a controlling means for controlling the on-off operation of the switching means in accordance with the compared result by the comparing means when the lock switch is in the locked-off state, and controlling to keep the state of switching means when lock switch is locked on irrespective of the compared result by comparing means.

Thus, if the lock switch is set to the lock-on state, the power source is not automatically turned on or off even when the current time coincides with the set time. Therefore, it is possible to temporarily override the automatic power source on-off function without needing to change the setting. In this manner, according to the present invention, since the automatic power source on-off function can be temporarily by a simple switching operation without changing the setting of the automatic power source on-off state, it becomes quite convenient.

Further, the apparatus may include a power source operation switch capable of manually controlling the on-off state of the switching means manually.

In addition, the controlling means comprises a D-type flip-flop having an output terminal coupled to the D input terminal, and for receiving signals for turning on and off the switching means on the basis of the compared result from the comparing means which is coupled to the S and R terminals respectively and receiving a signal supplied from the power source operating switch at its CK input terminal. The controlling means also comprises a prohibiting means for prohibiting an input of a signal of the compared result from the comparing means with respect to S and R terminals in accordance with the state of the lock switch, such that the on-off operation of the switching means is controlled by the output of the D-type flip-flop.

Moreover, the apparatus further includes a sub-power source circuit for receiving a supply of power from a power source voltage supply line at the upstream side of the switching means, and a voltage is applied to time counting means, memory means, comparing means, lock switch and controlling means from sub-power source circuit.

Furthermore, controlling means controls the on-off operation of switching means in accordance with the compared result of comparing means and the on-off operation of power source operating switch, such that the state of the switching means is maintained irrespective of the compared result of comparing means and the on-off operation of power source operating switch when the lock switch is in lock-on state.

As a result, it is possible to override both the power source voltage supply function by the power source operating switch and the automatic power source on-off function be by the use of the lock switch.

Further, the present apparatus includes a D-type flip-flop having an output terminal coupled to the D input terminal for receiving signals for turning on and off the switching means depending on the compared result from the comparing means to its S and R terminals respectively, and receiving a signal from power source operating switch at its CK input terminal, and a prohibiting means for prohibiting any input of the signal representing the compared result by the comparing means to the S and R terminals in accordance with the state of the lock switch, so as to control the on-off operation of the switching means by the output of the D-type flip-flop.

The above and other objects, features and advantages of the present invention will become clear from the following description of the preferred embodiment thereof, taken in conjunction with the accompanying drawings.

DETAILED DESCRIPTION OF THE PREFERRED EMBODIMENTS

Figure 1:
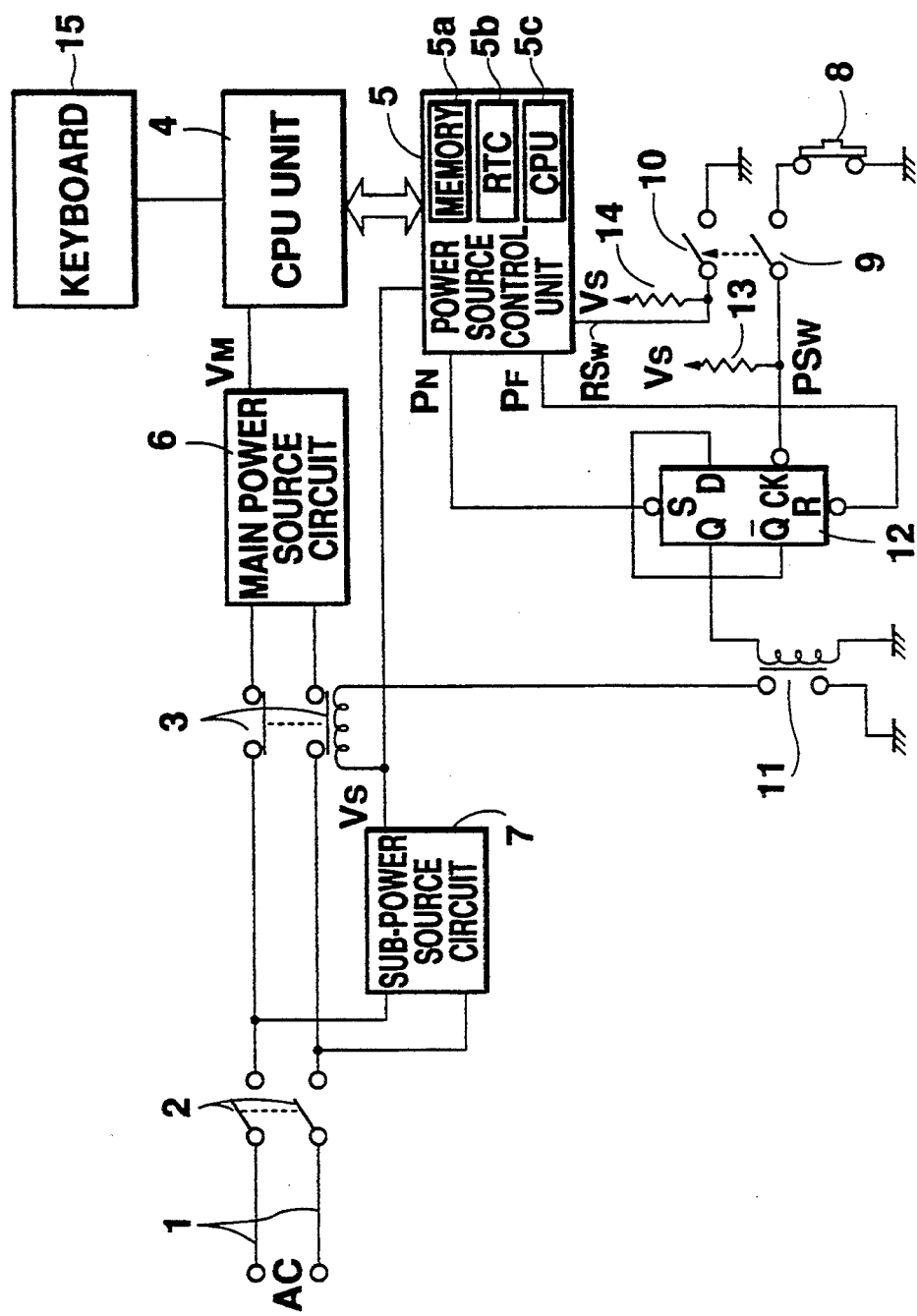
FIG. 1 is a block diagram showing a composition of an embodiment according to the present invention.

FIG. 1 is a block diagram showing a composition of an embodiment according to the present invention, in which the numerals designate respectively: 1, an A.C. power source line; 2, a main switch being capable of manually operated and inserted into the A.C. power source line 1; 3, a first relay inserted serially with the main switch 2 into the A.C. power source line 1; 4, a CPU unit forming an essential part of the apparatus; 5, a power source controlling unit for controlling tile power source; 6, a main power source circuit coupled to the output side of the first relay 3 for supplying a main power source voltage VM to essential parts of the apparatus such as the CPU unit 4; 7, a sub-power source circuit for receiving an A.C. power source voltage between the main switch 2 and the first relay 3 for supplying a sub-power source voltage Vs to the first relay 3 and the power source controlling unit 5; 8, a power source switch for controlling the on-off state of the power source normally by the manual operation of the operator; 9, a first power source lock switch for locking a state of the power source; 10, a second power source lock switch interlocking with the first power source lock switch; 11, a second relay for controlling the on-off state of the first relay 3; 12, a D-type flop-flop as a driving circuit for driving the second relay 11 in accordance with the controlling signals PN, PF sent from the power source controlling unit 5 and the state of the switches 8, 9.

The first power source switch 9 is serially coupled to the power source switch 8, while the other terminal of the power source switch 8 is grounded. The other terminal of the power source lock switch 9 is connected to the clock terminal CK of the D-type flip-flop 12 and pulled up by a resistor 13. The second power source lock switch 10 has one end grounded and the other pulled up by a resistor 14, and the output from the other end is input to the power source controlling unit 5. In the shown embodiment, the first power source lock switch 9 is composed as a manual switch, with which the second power source lock switch 10 interlocks. Alternatively, however, it is possible to make either one of the two power source lock switches 9, 10 a manual switch.

Further, the inverted Q output of the D-type flip-flop is coupled to the D terminal, while the set terminal S and the reset terminal R receive respectively control signal PN and PF from the power source controlling unit 5, and the Q output terminal is connected to the second relay 11.

The power source controlling unit 5 is provided with, to achieve an automatic power source on-off function, a non-volatile memory 5a for storing a set time, a real-time clock RTC 5b as a time counting means, and a CPU 5c as a control section.

Further, the keyboard 15 acts as an input means for inputting various commands and data.

Next, the mounting structure of the power source switch and power source lock switch will now be described with reference to FIGS. 2 and 3.

Figure 2:
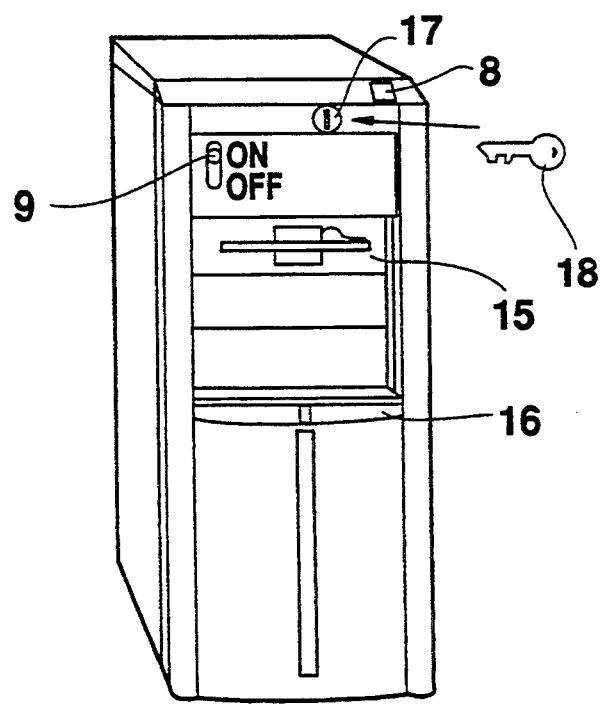
FIG. 2 is a perspective view showing an information processing apparatus body with a slide door opened.
Figure 3:
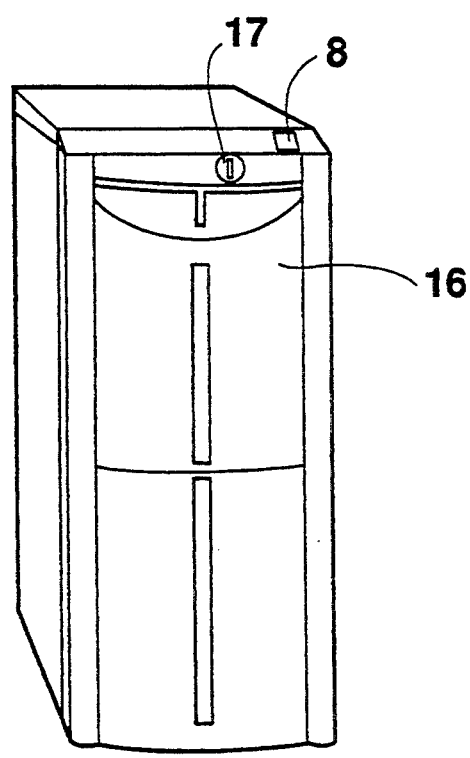
FIG. 3 is a perspective view of an information processing apparatus body with a slide door closed.

FIGS. 2 and 3 are perspective views showing the entire composition of the information processing apparatus including the embodiment. As shown in the FIGS., this apparatus has a vertically movable slide door 16 at the front side. By inserting a key 18 into a key hole and rotating it, the open-close operation of the slide door 16 can be locked. A power source switch 8 is disposed outside of the slide door 16, while a first power source lock switch 9 is located inside the slide door along with a floppy disc drive 15.

Therefore, once the slide door 16 is closed and locked, the power source lock switch can no longer be operated.

The operation of the present invention will now be described. With regard to the first and second power source lock switches, the closed state and the opened state will be referred to respectively as "lock off" and "lock on" hereinafter.

Firstly, when the main switch 2 is turned on, an A.C. power source is supplied to a sub-power source circuit 7 which supplies a sub-power source voltage Vs to a power source controlling system such as a power source controlling unit 5 or the like. In this state, since the first relay 3 is in the off state, no A.C. power source is provided to the main power source circuit 6. The D-type flip-flop 12 is reset at tile rising edge of the sub-power source voltage Vs.

Figure 4:
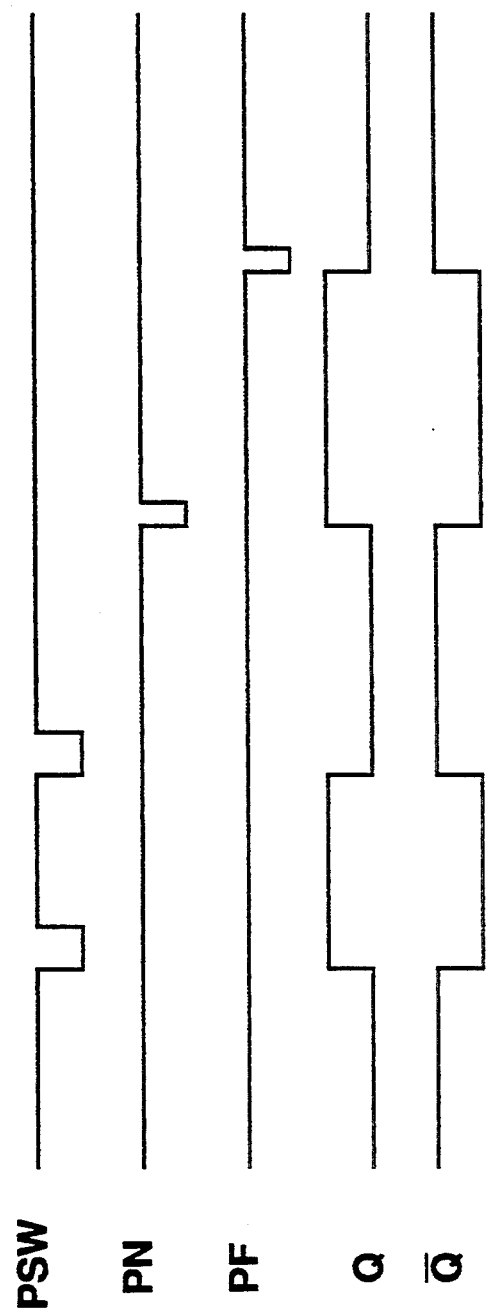
FIG. 4 is a timing diagram showing an operating state of the signals.

Next when the power source switch 8 is depressed while maintaining the lock off state of the first power source lock switch 9, a pulse-like switch signal PSW having L level only during the depressing period is input to the clock terminal CK of the D-type flip-flop 12 as shown in FIG. 4. As a result, the D-type flip-flop 12 receives the H level of the inverted Q output from the D input terminal, thereby changing the Q output from L level to H level. Thus, the second relay 11 turns on and subsequently the first relay 3 is turned on to supply the A.C. power source to the main power source circuit 6.

In this manner, the main power source Voltage VM is fed to the essential parts of the apparatus such as the CPU 4 and the like from the main power source circuit 6.

In such a power source supplying state, when the power source switch 8 is depressed, since the first power source lock switch 9 is in the locked state, a pulse-like switch signal of L-level is input to the clock terminal Ck of the D-type flip-flop 12 in the same manner as the aforementioned case. At this time, since the inverted Q output is at L level, the Q output is changed from H level to L level so as to turn off the second and the first relays 11 and 3. In consequence, the supply of the main power source voltage VM becomes shut down.

However, if the first power source lock switch 9 is locked on, the switch signal PSW remains at H level even when the power source switch 8 is depressed, so the state of the D-type flip-flop is unchanged. Therefore, when the first power source lock switch 9 is turned on with the main power source voltage VM being supplied, the power source supplying state is maintained irrespective of the operation of the power source switch 8. Meanwhile, if the first power source lock switch 9 is turned on with the main power source voltage VM being shut down, the power source shut down state is maintained irrespective of the operation of the power source switch 8.

By closing and locking, using the key, the slide door 16 after the operation of the first power source lock switch 9, unauthorised turning on and off of the power source by the third person will be securely prevented.

Subsequently, the automatic power source on-off function by the power source controlling unit 5 will now be described with reference to a flow diagram shown in FIG. 5.

Firstly, a schedule set-up program is executed by the CPU unit 4 to set the time to turn on the power source (schedule on time) and the time to turn off the power source (schedule off time) through the keyboard 15 (S1). These set times are transferred from the CPU unit 4 to the power source controlling unit 5 to be written into the non-volatile memory 5a located inside thereof (S2). The non-volatile memory 5 is composed of, for example, an EEPROM.

The CPU 5c of the power source controlling unit 5 compares the current time counted by the RTC 5b to the abovementioned set time (S3), and checks if both times are coincdent using a polling routine (S4). In this checking operation, if both times are in agreement, the second power source lock switch 10 is determined to be locked on or locked off (S5). If it is locked off, a controlling signal PN or PF is output (S6). More specifically, if the schedule on time and the current time are in agreement, a signal PN is output, and if the schedule off time and the current time are in agreement a signal PF is output. These signals PN, PF are respectively coupled to the set terminal S and the reset terminal R of the D-type flip-flop 12. Therefore, as shown in FIG. 4, at the schedule on time, the D-type flip-flop 12 receiving a PN not at a L level is set, the Q output becomes H level, and the relays 11 and 3 turn on to start the supply of the power source voltage VM. On the other hand, at the schedule off time, the PF becomes L level, the D-type flip-flop 12 is reset, the Q output becomes L level to shut down the supply of the power source voltage VM (S7). Further, whether the second power source lock switch 10 is locked on or locked off is determined by the level of the signal RSW being H level or not.

Figure 5:
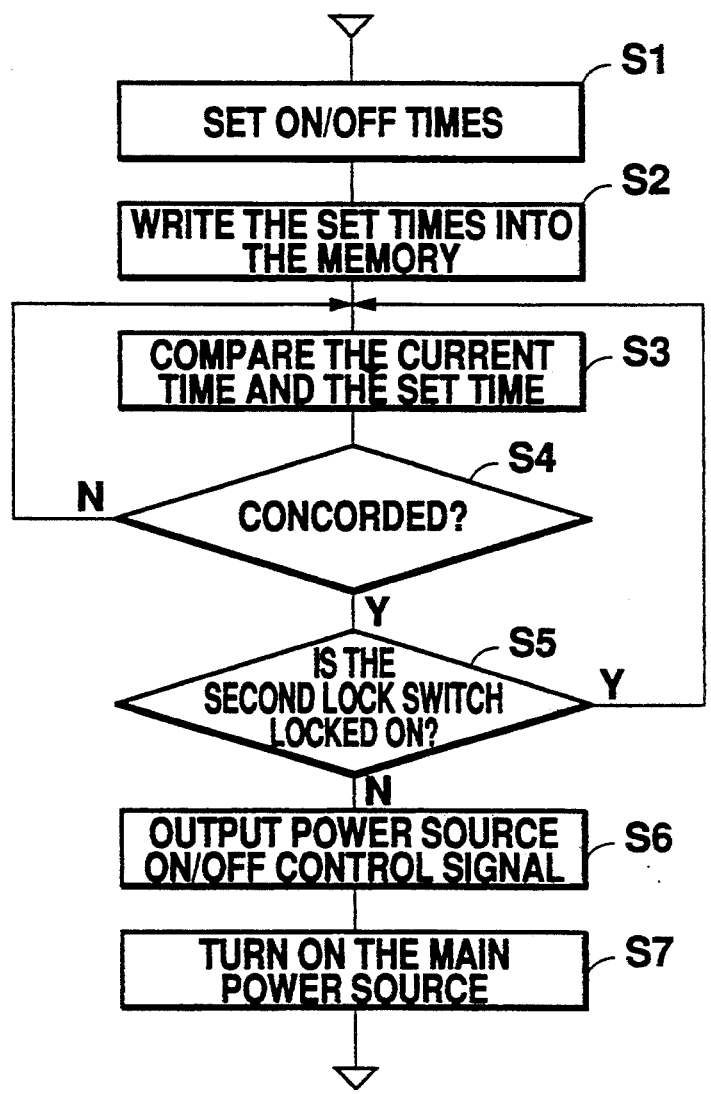
FIG. 5 is a flow diagram showing a processing contents of the power source controlling unit according to the present invention.

Meanwhile, when the second power source lock switch 10 is locked on, as shown in FIG. 5, the control signals PN and PF are not output even when the times are in agreement. Therefore, in this case, the automatic power source on-off function does not work. As a result, only by operating the second power source lock switch 10, can the automatic power source on-off function be temporarily overridden without needing any renewal of the already set data using a schedule set-up program as in the conventional art.

Figure 6A:
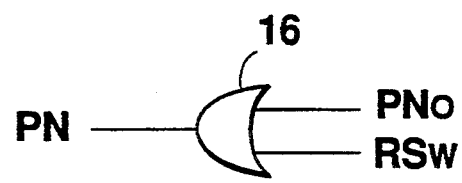
FIGS. 6A and 6B show embodiments of the output controlling operation for PN and PF respectively.
Figure 6B:
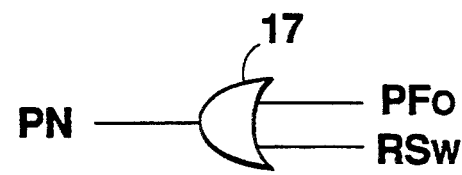

The operation for prohibiting the output of the control signals PN, PF in the lock on state is carried out by a predetermined program in CPU 5c. However, it is alternatively possible to achieve it in a hardware manner as shown in FIGS. 6A and 6B. Namely, PNo and PFo are output at a set time from the CPU 5c to be input to the OR gate 16 and 17, respectively. To each of the other input terminals of the OR gates 16 and 17, RSW is input respectively. Therefore, for a lock on state with the RSW signal at H level, the PN and PF are fixed to H level.

What is claimed is:

1. A power source voltage supply controlling apparatus for controlling a supply or shut down of power source voltage for essential parts of an electric apparatus, comprising:
    a switching means disposed in a supply line of the power source voltage for controlling supply and shut down of the power source voltage;
    a time counting means for detecting the current time;
    a memory means for storing a set time;
    a comparing means for comparing the set time stored in said memory means and the current time;
    a manual lock switch capable of being set to lock off state and lock on state; and
    a control means for controlling the on-off operation of said switching means in accordance with the compared result of said comparing means when said lock switch is locked off and for controlling said switching means to maintain its state irrespective of the compared result of said comparing means when said lock switch is locked on.

2. An apparatus according to claim 1, wherein said apparatus further comprises a power source operating switch capable of manually operating on-off switching means.

3. An apparatus according to claim 2, wherein said control means comprises:
    a D-type flip-flop having an output terminal coupled to the D input terminal, and a S terminal and a R terminal for receiving signals for turning on and off the switching means on the basis of said comparing means;
    a prohibiting means for prohibiting the input of signals based on the compared result from said comparing means with respect to the S and R terminals in accordance with the state of said lock switch;
    thereby controlling the on*off operation of said switching means by the output from the D-type flip-flop.

4. An apparatus according to claim 1, wherein said apparatus further comprises:
    a sub-power source circuit for receiving a power supply from a power source supply line at the upstream side of said switching means,
    thereby applying a voltage to said time counting means, memory means, lock switching means and control means.

5. An apparatus according to claim 1, wherein said apparatus further comprises a manual power source operating switch for controlling the on-off operation of said switching means, and:
    said control means controls the on-off operation of said switching means in accordance with the compared result of said comparing means and the on-off state of said power source operating switch when said lock switch is locked off, and controls the switching means to maintain its state irrespective of the on-off state of said power source operating switch and the compared result of said comparing means.

6. An apparatus according to claim 5, wherein said apparatus further comprises:
    a D-type flip-flop having an output terminal coupled to said D input terminal, S and R terminal for receiving signals for turning on and off the switching means on the basis of the compared result in said comparing result, and a CK input terminal for receiving signals from said power source operating switch;
    a prohibiting means for prohibiting input of signals based on the compared result from said comparing means to said S and R terminals;
    thereby controlling the on-off operation of said switching means by the output of the D-type flip-flop.

7. An apparatus according to claim 1, wherein said apparatus further comprising a lid for covering said lock switch for removing the lock switch from external view by closing the lid.

8. An apparatus according to claim 7, wherein said apparatus further includes a locking means for locking said lid.

9. A power source voltage supply controlling apparatus according to claim 1, wherein said control means includes:
    a state maintaining means for changing its state in accordance with the compared result of said comparing means.

10. A power source voltage supply controlling apparatus for controlling a supply or shut down of power source voltage for essential parts of the apparatus, comprising:
    a switching means disposed in a supply line of the power source voltage for controlling supply and shut down of the power source voltage;
    a manual power source operating switch for controlling the on-off operation of said switching means;
    a time counting means for detecting the current time;
    a memory means for storing a set time;
    a comparing means for comparing the set time stored in said memory means and the current time;
    a first lock switch manually operatable between lock off state and lock on state;
    a second lock switch being ganged to the first lock switch;
    a first control means for controlling the on-off operation of said switching means in accordance with the compared result of said comparing means when one of said first and second lock switch is locked off, and for controlling the switching means to maintain its state irrespective of the compared result of said comparing means when the other of said first and second lock switches is locked on; and
    a second control means for controlling the on-off operation of said switching means in accordance with the on-off state of said power source operating switch when one of said first and second lock switches is locked off, and for controlling the switching means to maintain its state irrespective of the on-off state of said power source operating switch when the other of said first and second lock switches is locked on.

11. A power source voltage supply controlling means according to claim 10, wherein said means further comprising a lid for covering said lock switch for removing the first lock switch from external view by closing the lid.

12. A power source voltage supply controlling means according to claim 11, wherein said means further includes locking means for locking said lid.

* * * * *